(12) United States Patent
Machol et al.

(10) Patent No.: US 8,856,166 B2
(45) Date of Patent: Oct. 7, 2014

(54) QUERY VALIDATOR

(75) Inventors: Gary Machol, Kfar Saba (IL); Guy Rozenwald, Ra'anana (IL)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/532,325

(22) Filed: Jun. 25, 2012

(65) Prior Publication Data
US 2013/0346435 A1  Dec. 26, 2013

(51) Int. Cl.
*G06F 7/00* (2006.01)
*G06F 17/30* (2006.01)

(52) U.S. Cl.
CPC .................................. *G06F 17/3064* (2013.01)
USPC .......................................................... 707/767

(58) Field of Classification Search
None
See application file for complete search history.

(56) References Cited

U.S. PATENT DOCUMENTS

| | | | |
|---|---|---|---|
| 5,812,840 A * | 9/1998 | Shwartz | 1/1 |
| 7,730,009 B1 * | 6/2010 | Higgins et al. | 706/50 |
| 8,442,993 B2 * | 5/2013 | Xu | 707/769 |
| 2005/0210017 A1 * | 9/2005 | Cucerzan | 707/3 |
| 2008/0270989 A1 * | 10/2008 | Ahadian et al. | 717/126 |
| 2009/0192966 A1 * | 7/2009 | Horvitz et al. | 706/46 |
| 2009/0281987 A1 * | 11/2009 | Krishnamoorthy et al. | 707/2 |
| 2010/0082581 A1 * | 4/2010 | Kreibe et al. | 707/706 |
| 2010/0223275 A1 * | 9/2010 | Foulger et al. | 707/767 |
| 2010/0241641 A1 * | 9/2010 | Byun et al. | 707/757 |
| 2010/0262615 A1 * | 10/2010 | Oztekin et al. | 707/768 |
| 2010/0268723 A1 * | 10/2010 | Buck | 707/759 |
| 2011/0282847 A1 * | 11/2011 | Collins et al. | 707/688 |
| 2012/0191698 A1 * | 7/2012 | Albrecht et al. | 707/718 |

OTHER PUBLICATIONS

StackOverflow.com post on webpage dated Nov. 21, 2010.*

* cited by examiner

*Primary Examiner* — Jay Morrison
(74) *Attorney, Agent, or Firm* — Buckley, Maschoff & Talwalkar LLC

(57) ABSTRACT

According to some embodiments, a method and apparatus are provided to receive a syntax correct query, analyze the syntax correct query, and output a message associated with the syntax correct query.

15 Claims, 4 Drawing Sheets

100

Receive a syntax correct query
101

Analyze the syntax correct query
102

Output a message associated with the syntax correct query.
103

400

| Application 402 | Rule 404 |
|---|---|
| 1 | 4 |
| 1 | 5 |
| 2 | 4 |

FIG. 4

QUERY VALIDATOR

BACKGROUND

Programming in a query language, such as a structured query language ("SQL"), may be prone to errors including typos or the use of an improper table name or table field. These errors will typically be discovered by a compiler when the query is executed and reported back to a developer.

Some queries comprise correct syntax (e.g., queries that will compile) but may have other problems that can manifest as issues in the future even if the errors do not occur in the present. These sorts of problems may occur for a variety of reasons, including a lack of developer experience in a specific application and its relationship to the application's database schema. These problems have a potential to only later appear at the customer site where they may be very expensive and time-consuming to fix.

BRIEF DESCRIPTION OF THE DRAWINGS

FIG. 4 illustrates a portion of a database that might be stored in accordance with some embodiments.

DETAILED DESCRIPTION

Figure 1:
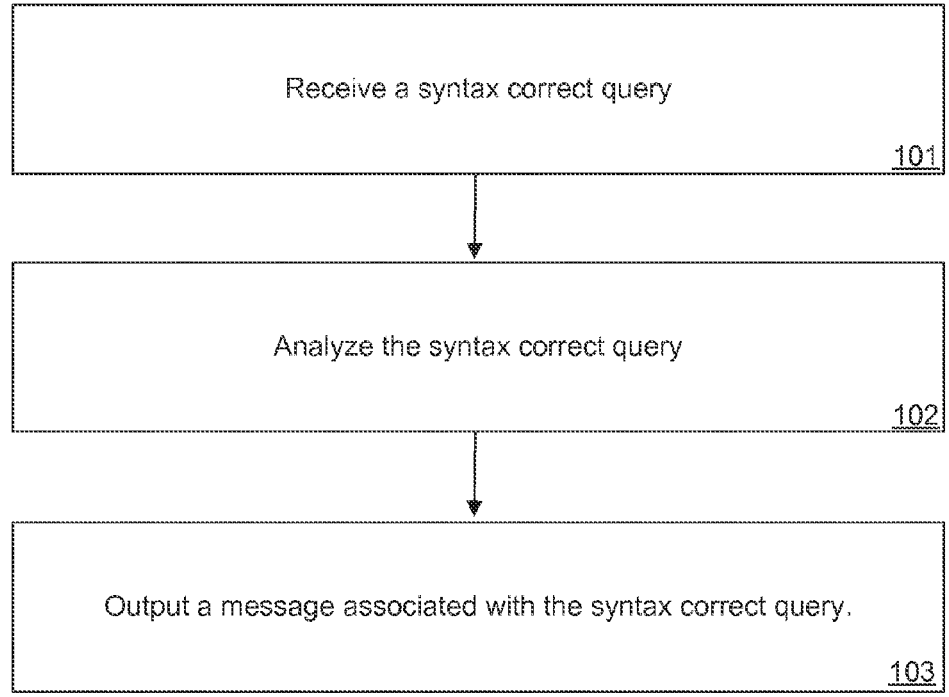
FIG. 1 illustrates a method according to some embodiments.

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 2. The method 100 may relate to providing warnings and/or suggestions associated with remedying a problem or potential problem with a query where the query comprises correct syntax.

At 101, a syntax correct query received. A syntax correct query may comprise a database query that is executable (e.g., no compile errors). A query may comprise code such as, but not limited to, SQL. For example, the query may be written in PL/SQL, JDOQL, or any other language associated with database management.

In one embodiment, the syntax correct query may be received as a text file. In another embodiment, the syntax correct query may be received as a trace file or as a log file to validate queries that have already been executed (e.g. dynamic queries). In yet another embodiment, the syntax correct query may be received by a validation program that runs in the background of a system while the query is being submitted for compilation or while the query is being entered into a system. In yet another embodiment, the syntax correct query may be automatically received in response to the SQL code being submitted into a source control system.

For illustrative purposes, and to aid in understanding features of the specification, some examples will now be introduced. These examples are not intended to limit the scope of the claims. For each example, we will assume a database that comprises the following two tables:

| CUSTOMER_PRIMARY_TBL ( | |
|---|---|
| INTERNAL_ID_PRIM | bigint, |
| CUSTOMER_SSN | integer, |
| NAME | varchar(512), |
| (remaining fields...)); | | and

| CUSTOMER_STAGING_TBL( | |
|---|---|
| INTERNAL_ID_STG | bigint, |
| CUSTOMER_SSN | integer, |
| NAME | varchar(512), |
| (remaining fields...)); | |

In a first example, the following query may be received:
select PRIM.INTERNAL_ID_PRIM, STG.INTERNAL_ID_STG
from CUSTOMER_PRIMARY_TBL as PRIM
inner join CUSTOMER_STAGING_TBL as STG on STG.NAME=PRIM.NAME The query of the first example is a syntax correct query meaning that this query will execute without any runtime errors.

In a second example, the following query may be received:
insert into CUSTOMER_PRIMARY_TBL
select * from CUSTOMER_STAGING_TBL
where INTERNAL_ID_STG=6

The query of the second example is a syntax correct query meaning that this query will execute without any runtime errors.

In a third example, the following query may be received:
select INTERNAL_ID_PRIM, INTERNAL_ID_STG
From CUSTOMER_PRIMARY_TBL, CUSTOMER_STAGING_TBL The query of the third example is a syntax correct query meaning that this query will execute without any runtime errors.

In a fourth example, a user may use a select statement such as the following:
select (fields) from CUSTOMER_STAGING_TBL The select statement of the fourth example is used as part of syntax correct query meaning that this query will execute without any runtime errors.

In a fifth example, a user may use a select statement such as the following:
select <field1>, <field2>, . . . , <field100> from CUSTOMER_PRIMARY_TBL The select statement of the fifth example is used as part of syntax correct query meaning that this query will execute without any runtime errors.

In a sixth example, the following query may be received:
select PRIM.INTERNAL_ID_PRIM, PRIM.NAME, . . . .
from CUSTOMER_PRIMARY_TBL as PRIM
where PRIM.NAME="

The query of the sixth example is a syntax correct query meaning that this query will execute without any runtime errors.

Next, at 102, the syntax correct query is analyzed. Analyzing may comprise automatically evaluating the query based on a set of user defined validations. The user defined validations are associated with the predetermined known potential issues. Potential issues may comprise, for example, a query that will return too much data, a query that may return potentially wrong data, and/or a query that is susceptible to failure.

The validations may comprise both generic and application-specific validations. The generic validations comprise validations based on known application risks in SQL applications. In some embodiments, example one, example two, and example three relate to generic validations.

The application-specific validations are associated with specific risks that are related to a particular application. In some embodiments, examples four, five, and six relate to application-specific validations. Validations may be selected by a user such as, but not limited to, a Technical Lead or Architect, for each specific application. The SQL code will be analyzed for each selected validation (e.g., both generic and application-specific validations).

Continuing with the above-mentioned examples, in the first example, the query may be analyzed based on a generic validation associated with providing more accurate results from the query. In this particular example, the join between the two tables fails to utilize a field that is found in both tables where the field comprises a same name and type, or that is explicitly defined as a foreign key to the other (e.g., CUSTOMER_SSN field). In the present example, the two tables are being joined via their respective Name fields. However, if there are two different users that share a same name (e.g., John Smith), the query would join these two records which may be an error. If the query also joined the two tables based on the SSN field then this error may be eliminated. Therefore, the validator would produce a warning that this query may produce inaccurate results and the validator may suggest that the SSN field be used as an element of the join (or a generic suggestion to use a foreign key join).

In the second example, the SQL code uses a "select*" statement associated with an insert statement. This may assume that the schemas of the two tables are identical and therefore the fields of each may not have to be defined explicitly. This query may work properly for a period of time. However, if any changes are made to either of the relevant tables (e.g., adding a field, changing a type of a field) then the SQL code may stop functioning (e.g., produce a compile error). Therefore, the validator would produce a warning that this SQL code may later stop functioning properly and suggest hard coding field names into the select statement.

In the third example, the "from" clause is "From CUSTOMER_PRIMARY_TBL, CUSTOMER_STAGING_TBL" which is a Cartesian join of every row in each table against each other. While this is a syntax correct join, this type of join may bring unnecessary and incorrect data as a result. For example, if each table has ten rows, the expected results of the join may be ten rows. However, with the Cartesian join, the results may comprise one hundred rows (e.g., 10×10 rows). In this example, the validator may produce a warning that the SQL code comprises a Cartesian join.

The fourth example, relates to a select statement such as "select (fields) from CUSTOMER_STAGING_TBL". If this table is known, by an architect or technical lead associated with the application, to contain a large number of rows, then this select statement may return too much data. A solution may be to provide a suggestion to place a "top" clause in the select statement, for example select top 1000 (fields) from CUSTOMER_STAGING_TBL. By using a top clause, only 1000 top records may be valid for the entire application (or for the given table). The determination of the number of records would be configured by the architect for the specific application. In this case the validator may provide a suggestion to use the top 1000 as indicated by the architect.

In the fifth example, a query run on too many columns in a column based table may make the query inefficient. For example, if the table CUSTOMER_PRIMARY_TBL is known to be a column-based table, then running a query having a select statement such as select <field1, <field2>, ..., <field100> from CUSTOMER_PRIMARY_TBL may cause the validator to generate a warning to be generated. The number of fields causing the warning would be determined by the architect for the entire application (or for the given table).

In the sixth example, a query may contain a clause that may be known by a Technical Lead or Architect to have slow performance, and for which there is a solution that is functionally equivalent and will provide better performance.

For example, the aforementioned query associated with the sixth example is functionally equivalent to the following query:

select PRIM.INTERNAL_ID_PRIM, PRIM.NAME, . . . .
from CUSTOMER_PRIMARY_TBL as PRIM
where length(PRIM.NAME)=0

In this query, instead of looking for a name that has a blank (e.g., a string comparison), the present query utilizes a length function which may run faster than a string comparison. In some embodiments, this type of substitute query may improve performance if a table is known to be large, and have a high cardinality. This query may be a query that is susceptible to slow performance.

Next, at 103, a message associated with the syntax correct query is output. As described above, the message may comprise a warning, a suggestion, or both a warning and a suggestion associated with the syntax correct query. By using automatic code validation, a senior and experienced technical person does not have to review each statement in the code because known validation issues may be accumulated in the validator to serve a large number of developers and coders.

Figure 2:
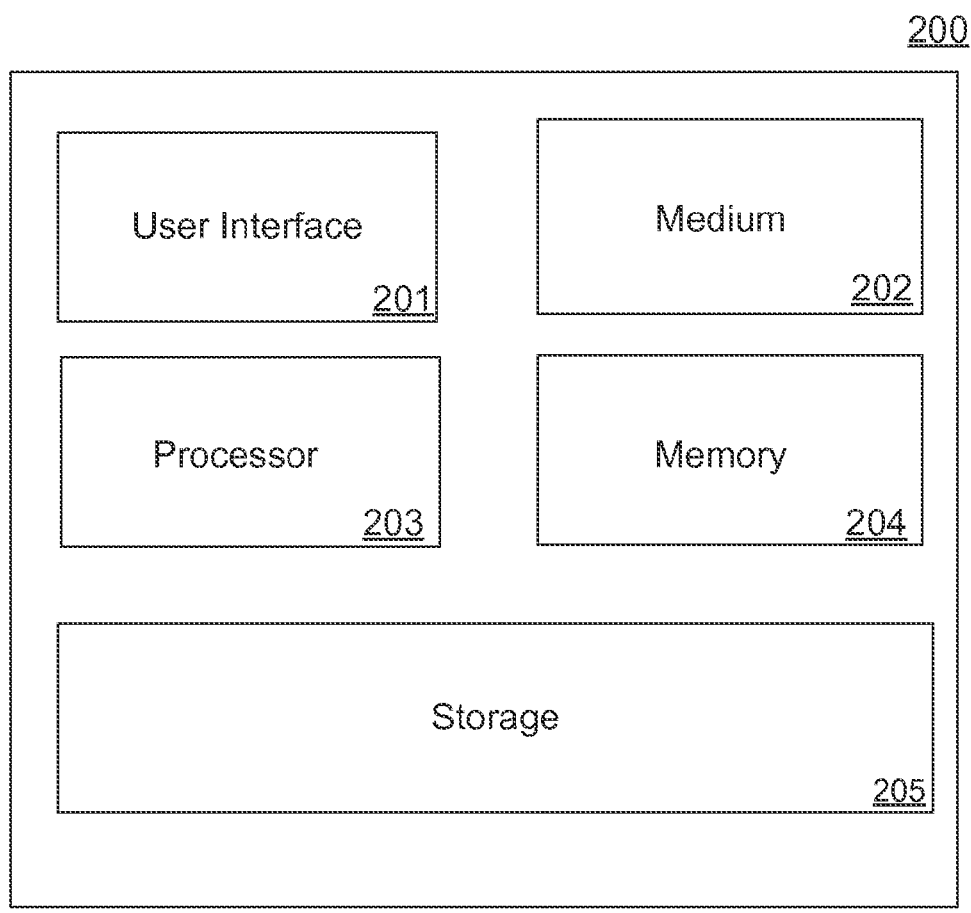
FIG. 2 illustrates a system according to some embodiments.

Now referring to FIG. 2, an embodiment of an apparatus 200 is illustrated. The apparatus 200 may comprise a user interface 201, a main memory 202, a processor 203, a medium 204, and a storage device 205. According to some embodiments, the apparatus 200 may further comprise a digital display port, such as a port adapted to be coupled to a digital computer monitor, television, portable display screen, or the like.

The user interface 201 may allow users to interact with the apparatus 200 using text commands or with images/graphical icons. In some embodiments, the user interface may comprise a keyboard, mouse, or associated port related thereto. Furthermore, the user interface 201 may comprise a display or a touch screen.

The main memory 202 may comprise any type of memory for storing data, such as, but not limited to, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 202 may comprise a plurality of memory modules.

The processor 203 may include or otherwise be associated with dedicated registers, stacks, queues, etc. that are used to execute program code and/or one or more of these elements may be shared there between. In some embodiments, the processor 203 may comprise an integrated circuit. In some embodiments, the processor 203 may comprise circuitry to perform a method such as, but not limited to, the method described with respect to FIG. 1.

The processor 203 communicates with the storage device 205. The storage device 205 may comprise any appropriate information storage device, including combinations of magnetic storage devices (e.g., a hard disk drive), optical storage devices, and/or semiconductor memory devices. The storage device 205 stores a program for controlling the processor 203. The processor 203 performs instructions of the program, and thereby operates in accordance with any of the embodiments described herein. For example, the processor 203 may outputting a message associated with the syntax correct query.

The medium 204 may comprise any computer-readable medium that may store processor-executable instructions to be executed by the processor 203. For example, the medium 204 may comprise a non-transitory tangible medium such as, but is not limited to, a compact disk, a digital video disk, flash memory, optical storage, random access memory, read only memory, or magnetic media.

The program may be stored in a compressed, uncompiled and/or encrypted format. The program may furthermore include other program elements, such as an operating system, a database management system, and/or device drivers used by the processor 203 to interface with peripheral devices.

As used herein, information may be "received" by or "transmitted" to, for example: (i) the apparatus 200 from another device; or (ii) a software application or module within the apparatus 200 from another software application, module, or any other source.

In some embodiments, the storage device 205 stores a database (e.g., including information associated with an application and its associated rules). An example of a database that may be used in connection with the apparatus 200 will now be described in detail with respect to FIG. 4. Note that the database described herein is only an example, and additional and/or different information may be stored therein. Moreover, various databases might be split or combined in accordance with any of the embodiments described herein.

Figure 3:
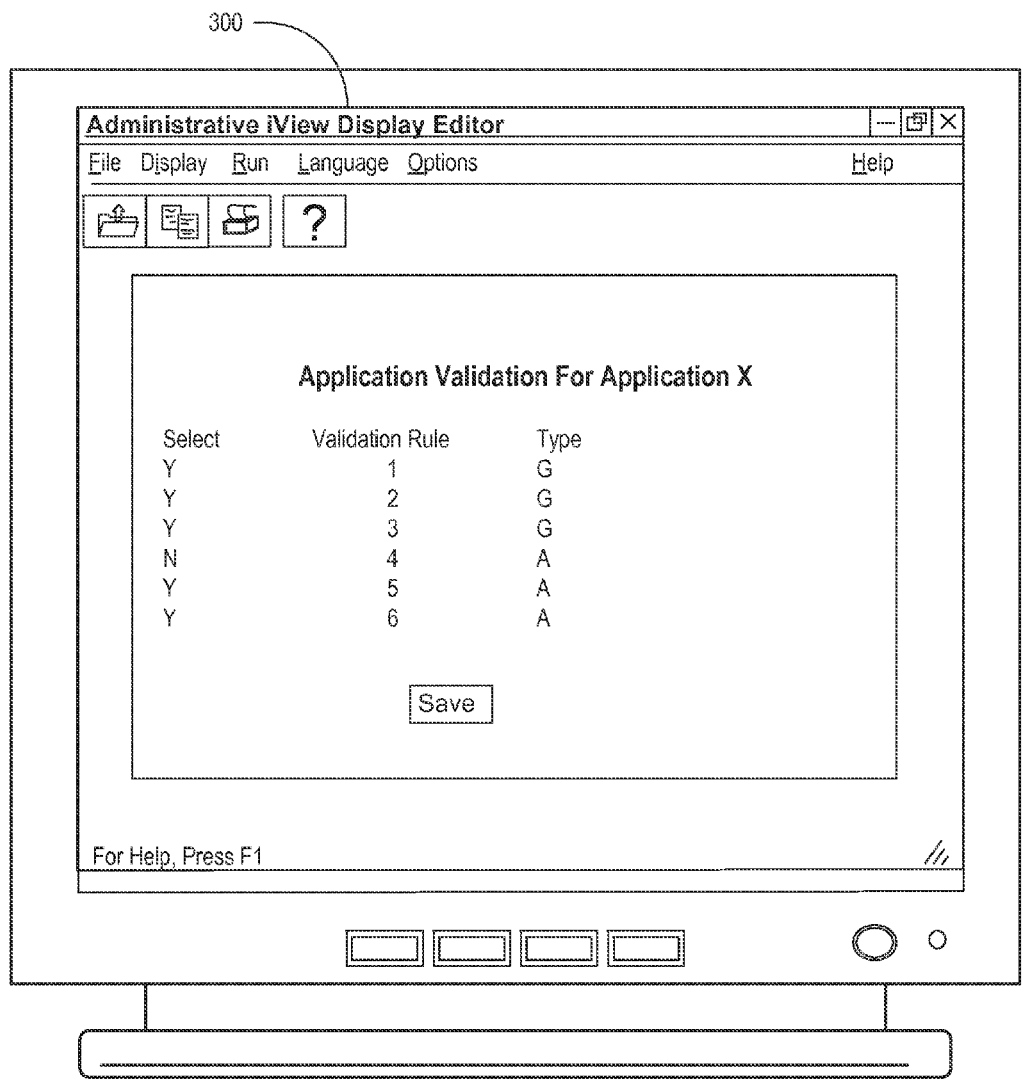
FIG. 3 illustrates an editor according to some embodiments.

FIG. 3 illustrates an editor 300 according to some embodiments. The editor 300 may facilitate assignment of rules to a specific application. For example, an administrator may select one or more validation rules that apply to an application, such as the illustrated application number X. As illustrated in the example embodiment, there are six available rules in the validator with the top three rules being indicated as generic and the remaining three validation rules being indicated as application specific. Furthermore, an administrator may determine which specific rules in the validator will be used to analyze received SQL code. For example, and as illustrated, validation rules 1, 2, 3, 5, and 6 will be used for application X while validation rule 4 will not be used.

Figure 4:
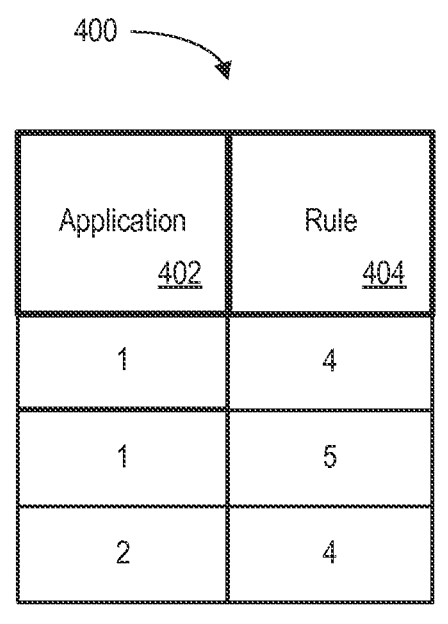

Referring to FIG. 4, a table is shown that represents a database 400 that may be stored locally at the apparatus 200 according to some embodiments. The table may include, for example, entries relating to specific validations rules that apply to specific applications. The table may also define fields 402 and 404 for each of the entries. The fields 402 and 404 may, according to some embodiments, specify: an application 402 and a rule 404.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Moreover, while embodiments have been illustrated using particular types of tables and databases, embodiments may be implemented in any other of a number of different ways. For example, some embodiments might be associated with publically available information, such as flight or train schedules available via web sites.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method comprising:
   receiving, from a log file, a syntax correct structured query language ("SQL") based query after the syntax correct SQL based query has been successfully executed;
   analyzing, via a processor, the syntax correct SQL based query, wherein analyzing comprises determining potential issues that may cause the syntax correct SQL based query to stop functioning properly based on a list of predetermined known potential issues associated with the syntax correct SQL based query, one of the known potential issues comprising a join between two tables that fails to utilize a field that is found in each table where the field comprises a same name and type or is explicitly defined as a foreign key; and
   outputting a message associated with the syntax correct SQL based query, wherein the message comprises a warning.

2. The method of claim 1, wherein the message further comprises a SQL based query change recommendation.

3. The method of claim 1, wherein one of the known potential issues comprises a SQL based query that will return too much data.

4. The method of claim 1, wherein one of the known potential issues comprises a SQL based query that may return potentially wrong data.

5. The method of claim 1, wherein one of the known potential issues comprises a SQL based query that is susceptible to failure.

6. The method of claim 1, wherein one of the known potential issues comprises a SQL based query that is susceptible to slow performance.

7. A non-transitory computer-readable medium comprising instructions that when executed by a processor perform a method, the method comprising:
   receiving, from a log file, a syntax correct SQL based query after the syntax correct query has been executed;
   analyzing, via a processor, the syntax correct SQL based query, wherein analyzing comprises determining potential issues that may cause the syntax correct SQL based query to stop functioning properly based on a list of predetermined known potential issues associated with the syntax correct SQL based query, one of the known potential issues comprising a join between two tables that fails to utilize a field that is found in each table where the field comprises a same name and type or is explicitly defined as a foreign key; and
   outputting a message associated with the syntax correct SQL based query, wherein the message comprises a warning.

8. The medium of claim 7, wherein the message further comprises a SQL based query change recommendation.

9. The medium of claim 7, wherein one of the known potential issues comprises a SQL based query that will return too much data.

10. The medium of claim 7, wherein one of the known potential issues comprises a SQL based query that may return potentially wrong data.

11. The medium of claim 7, wherein one of the known potential issues comprises a SQL based query that is susceptible to failure.

12. The medium of claim 7, wherein one of the known potential issues comprises a SQL based query that is susceptible to slow performance.

13. An apparatus comprising:
a processor;
a non-transitory computer-readable medium comprising instructions that when executed by the processor perform a method, the method comprising:
receiving, from a log file, a syntax correct SQL based query from a log file or a trace file after the syntax correct SQL based query has been successfully executed;
analyzing the syntax correct query, wherein analyzing comprises determining potential issues that may cause the syntax correct SQL based query to stop functioning properly based on a list of predetermined known potential issues associated with the syntax correct SQL based query, one of the known potential issues comprising a join between two tables that fails to utilize a field that is found in each table where the field comprises a same name and type or is explicitly defined as a foreign key; and
outputting a message associated with the syntax correct SQL based query, wherein the message comprises a warning.

14. The apparatus of claim 13, wherein the message further comprises a SQL based query change recommendation.

15. The apparatus of claim 13, wherein one of the known potential issues comprises a SQL based query that will return too much data, a SQL based query that may return potentially wrong data, a SQL based query that is susceptible to failure, or a SQL based query that is susceptible to slow performance.

* * * * *